United States Patent
Tauchi et al.

(10) Patent No.: US 6,344,089 B1
(45) Date of Patent: Feb. 5, 2002

(54) DRIVE CONTROL FOR ELEVATOR

(75) Inventors: Shigeaki Tauchi, Aichi; Toru Tanahashi, Tokyo, both of (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/928,997

(22) Filed: Aug. 15, 2001

Related U.S. Application Data

(62) Division of application No. 09/381,197, filed as application No. PCT/JP97/00877 on Mar. 18, 1997.

(51) Int. Cl.[7] ............................................... B66B 1/34
(52) U.S. Cl. ..................................................... 127/391
(58) Field of Search ............................... 187/391, 393, 187/414; 318/66, 68, 69, 70, 638, 647, 461, 465, 416, 254, 439, 138, 823, 806; 73/862, 473, DIG. 3

(56) References Cited

U.S. PATENT DOCUMENTS

| | | | |
|---|---|---|---|
| 4,311,933 A | | 1/1982 | Riggs et al. |
| 4,399,953 A | * | 8/1983 | Macchia .................. 242/47.08 |
| 4,844,557 A | * | 7/1989 | Giers .......................... 303/111 |
| 4,845,411 A | | 7/1989 | Smith |
| 4,939,679 A | * | 7/1990 | David et al. ................ 187/115 |
| 5,083,067 A | | 1/1992 | Soushin et al. |
| 5,107,195 A | | 4/1992 | Lyons et al. |
| 5,167,401 A | * | 12/1992 | James et al. .................. 318/66 |
| 5,458,216 A | | 10/1995 | Tanaka et al. |
| 5,677,605 A | | 10/1997 | Cambier et al. |
| 5,793,169 A | | 8/1998 | De Filippis et al. |
| 5,894,315 A | * | 4/1999 | Yamane ........................ 347/14 |
| 5,932,979 A | * | 8/1999 | Sun .............................. 318/254 |
| 5,973,461 A | | 10/1999 | Permuy |
| 6,051,943 A | | 4/2000 | Rabin et al. |
| 6,164,200 A | * | 12/2000 | Mathea ........................ 101/227 |

FOREIGN PATENT DOCUMENTS

| | | |
|---|---|---|
| EP | 0 631 970 | 1/1995 |
| EP | 0 706 258 | 4/1996 |
| GB | 2270896 | 3/1994 |
| JP | 59-76191 | 5/1984 |
| JP | 1-129796 | 5/1989 |
| JP | 7-117-957 | 5/1995 |
| WO | WO 96/06793 | 3/1996 |

OTHER PUBLICATIONS

Summary of pp. 97–98 from "Fundamental & Implementation of Servo–Sensor", C. T. Tu, Published by Chuan–Hua Scientific Books Co., Ltd., Sep. 15, 1989.

\* cited by examiner

*Primary Examiner*—Jonathan Salata
(74) *Attorney, Agent, or Firm*—Leydig, Voit & Mayer, Ltd.

(57) ABSTRACT

A drive machine for elevators includes a rotatable drive sheave over which a main cable for hanging an elevator cage is wound, a stationary shaft for supporting rotation of the drive sheave and bearing a load applied to the drive sheave by the main cable, a field magnet attached to the drive sheave, constituting a part of an electric motor, and including at least one pair of magnetic poles, an armature attached to the stationary shaft facing the field magnet and constituting another part of the motor, and a field magnetic pole detector for detecting a magnetic pole of the field magnet rotating together with the drive sheave.

2 Claims, 9 Drawing Sheets

DRIVE CONTROL FOR ELEVATOR

This application is a Div of Ser. No. 09/381,197, filed Sep. 17, 1999, which is a 371 of PCT/JP97/00877 filed Mar. 18, 1997.

TECHNICAL FIELD

The present invention relates to an elevator apparatus and, more particularly, to a drive machine for elevators which employs an outer rotor motor.

BACKGROUND ART

FIGS. 11 and 12 show a conventional elevator apparatus disclosed in, for example, Japanese Unexamined Patent Publication No. 7-117957. The disclosed elevator apparatus is of the traction sheave type wherein a main cable is wound over a drive sheave, and a cage and a counterweight are moved up and down in opposite directions. The elevator apparatus employs, as a winder, an outer rotor motor. FIG. 11 is a perspective view of the elevator apparatus, and FIG. 12 is an enlarged sectional view of a drive machine shown in FIG. 11.

Referring to FIGS. 11 and 12, denoted by numeral 1 is an elevator pit, 2 is a cage, 3 is a cage guide rail vertically provided as a pair within the elevator pit 1 for guiding both sides of the cage 2 so that the cage moves up and down along a predetermined path, 4 is a counterweight, 5 is a counterweight guide rail vertically provided as a pair within the elevator pit 1 for guiding both sides of the counterweight 4 so that the counterweight moves up and down along a predetermine path, and 6 is a braking device associated with the counterweight 4 and tightly pressed against the counterweight guide rails 5 for applying a brake as the occasion requires. Numeral 7 denotes a support beam provided at the top of the elevator pit 1, and 8 denotes a winder comprising an outer rotor motor provided at the top of the elevator pit 1.

As shown in FIG. 12, the winder 8 mainly comprises a stationary shaft 9 having opposite ends supported by and fixed to the support beams 7, an armature iron-core 11 fixed to the shaft 9 and having armature coils 10 wound over the same, and a rotor 12 rotatably supported by the shaft 9 and constituting a drive sheave.

The rotor 12 includes a field iron-core 13, a field permanent magnet 14, a drive sheave 16 having cable grooves formed in its outer periphery, and bearings 17 disposed between the rotor and the shaft 9 for rotatably supporting the former relative to the latter. Numeral 18 denotes an elevator main cable wound along the sheave groove 15, the main cable having one end coupled to the cage 2 and the other end coupled to the counterweight 4. Numeral 19 denotes a braking device associated with the rotor 12 for stopping the rotor 12.

Numeral 20 denotes an absolute value encoder in the form of a ring. The absolute value encoder 20 is arranged such that it surrounds a projected flange of the rotor 12, is joined to the projected flange of the rotor 12 through a baring 21 for free rotation of the rotor 12, and is fixed through a mounting fixture 23 to an encoder holder 22 which is secured to the shaft 9. Numeral 24 denotes a supporting fixture provided on each of the support beams 7 on both sides for supporting the shaft 9.

In the drive machine thus constructed, the magnetic pole position of the field permanent magnet 14 is detected by the absolute value encoder 20, and the phases of currents supplied to the armature coils 10 are controlled in accordance with the detected result. Also, the rotating speed and the rotating direction of the rotor 12 and hence the drive sheave 16 are detected by the absolute value encoder 20 in order to control the rising/lowering speed and the moving direction of the cage 2.

In not only such a synchronous motor using a field permanent magnet, but also other electric motors such as the so-called three-phase induction motor, it is important to detect the rotational angle of a rotor with respect to a field magnet in a circuit driving control for any of those motors.

The above-described conventional drive machine for elevators has problems below. Supposing, for example, that the absolute value encoder 20 directly attached to the shaft of the winder malfunctions and has to be replaced, because the absolute value encoder 20 is in the ring form, it is required to dismount the entirety of the winder 8 by moving the shaft 9 upward so as to be withdrawn from the supporting fixtures 24 fixed to the support beams 7, thus resulting in troublesome work. In addition, when the winder 8 is mounted at the top of the elevator pit 1, scaffolding must be temporarily built up, which renders the replacement work more troublesome.

Further, because the absolute value encoder 20 is in the ring form and arranged in a surrounding relation to the projected flange of the rotor 12, its inner diameter is so large that an inexpensive absolute value encoder, which is usually employed in general motors having rotary shafts, is not usable. This raises another problem that the absolute value encoder 20 must be a custom and expensive product.

Still another problem is that because the magnetic pole position of the field magnet is indirectly determined by the absolute value encoder 20 surrounding the projected flange of the rotor 12, the accurate magnetic pole position of the field magnet cannot be obtained.

The present invention has been accomplished with the view of solving the-problems set forth above, and its object is to provide a drive machine for elevators which can determine the accurate magnetic pole position of a field magnet, and can facilitate maintenance work for a detecting unit to detect the magnetic pole position, the rotating speed and the rotating direction of the field magnet.

DISCLOSURE OF THE INVENTION

A first aspect of the present invention resides in a drive machine for elevators, which comprises a rotatable drive sheave over which a main cable for hanging an elevator cage is wound, a stationary shaft for supporting rotation of the drive sheave and bearing a load applied to the drive sheave from the main cable, a field magnet attached to the drive sheave, constituting a part of an electric motor, and comprising at least one pair of magnetic poles, an armature attached to the stationary shaft in a facing relation to the field magnet and constituting another part of the motor, and a field magnetic pole detector for detecting the predetermined magnetic pole of the field magnet rotated together with the drive sheave.

A second aspect of the present invention resides in, on the basis of the drive machine for elevators according to the first aspect, that the field magnet comprises a permanent magnet.

A third aspect of the present invention resides in, on the basis of the drive machine for elevators according to the first or second aspect, that the field magnetic pole detector comprises a magnetic sensor attached to the stationary side in a close and facing relation to the field magnet.

A fourth aspect of the present invention resides in, on the basis of the drive machine for elevators according to the first aspect, that a detected portion indicating the position of the magnetic pole disposed on the drive sheave is provided on the drive sheave in a facing relation to the field magnetic pole detector, and the position of the predetermined magnetic pole is recognized with the field magnetic pole detector detecting the detected portion.

A fifth aspect of the present invention resides in, on the basis of the drive machine for elevators according to the fourth aspect, that the detected portion comprises a convex or concave portion formed on or in the surface of the drive sheave corresponding to the position of the predetermined magnetic pole.

A sixth aspect of the present invention resides in, on the basis of the drive machine for elevators according to the first aspect, that the field magnetic pole detector is provided at least three at a pitch equal to ⅓ of the pitch of one pair of the field magnetic poles.

A seventh aspect of the present invention resides in, on the basis of the drive machine for elevators according to the second or sixth aspect, further comprising a rotation detector for detecting rotation of the drive sheave with respect to the stationary shaft as a reference, and drive control means for executing drive control of the motor in accordance with results detected by the rotation detector and the field magnetic pole detector, wherein the drive control means starts up the motor in accordance with an imaginary field magnetic pole position when the magnetic pole position of the field magnet attached to the drive sheave is not known at the start-up of the elevator, and executes the drive control in accordance with the results detected by the field magnetic pole detector and the rotation detector after the field magnetic pole position has been recognized upon operation of the field magnetic pole detector.

An eighth aspect of the present invention resides in, on the basis of the drive machine for elevators according to the first aspect, further comprising a rotation detector for detecting rotation of the drive sheave with respect to the stationary shaft as a reference, detection difference calculating means for detecting the difference between the rotation of the drive sheave detected by the rotation detector and the rotation of the drive sheave detected by the field magnetic pole detector, and anomaly determining means for determining the occurrence of an anomaly when a value of the difference determined by the detection difference calculating means exceeds a predetermined value.

A ninth aspect of the present invention resides in, on the basis of the drive machine for elevators according to the eighth aspect, further comprising drive control means for executing drive control of the motor in accordance with results detected by the rotation detector and the field magnetic pole detector, wherein when the value of the difference determined by the detection difference calculating means does not exceed the predetermined value, the drive control means executes the control while correcting an output value of the rotation detector in accordance with the value of the difference.

A tenth aspect of the present invention resides in, on the basis of the drive machine for elevators according to the first aspect, further comprising a rotation detector for detecting rotation of the drive sheave with respect to the stationary shaft as a reference, memory means for storing an output of the rotation detector in a corresponding relation to the position detected by the field magnetic pole detector while the field magnetic pole detector is detecting the field magnetic pole position with the rotation of the drive sheave, and drive control means for executing drive control of the motor in accordance with results detected by the rotation detector and the field magnetic pole detector, wherein the drive control means utilizes values stored in the memory means for phase control of electric power supplied to the armature.

An eleventh aspect of the present invention resides in, on the basis of the drive machine for elevators according to the first aspect, further comprising a rotation detector for detecting rotation of the drive sheave with respect to the stationary shaft as a reference, and drive control means for executing drive control of the motor in accordance with results detected by the rotation detector and the field magnetic pole detector, wherein the amount of change in value detected by the rotation detector is determined at the start-up of the elevator while the field magnetic pole detector detects one pair of the field magnetic poles, and the drive control means executes phase control of the motor by setting the amount of change as a reference value of a phase signal for one pair of the field magnetic poles since then.

BEST MODE FOR CARRYING OUT THE INVENTION

First Embodiment

Figure 1:
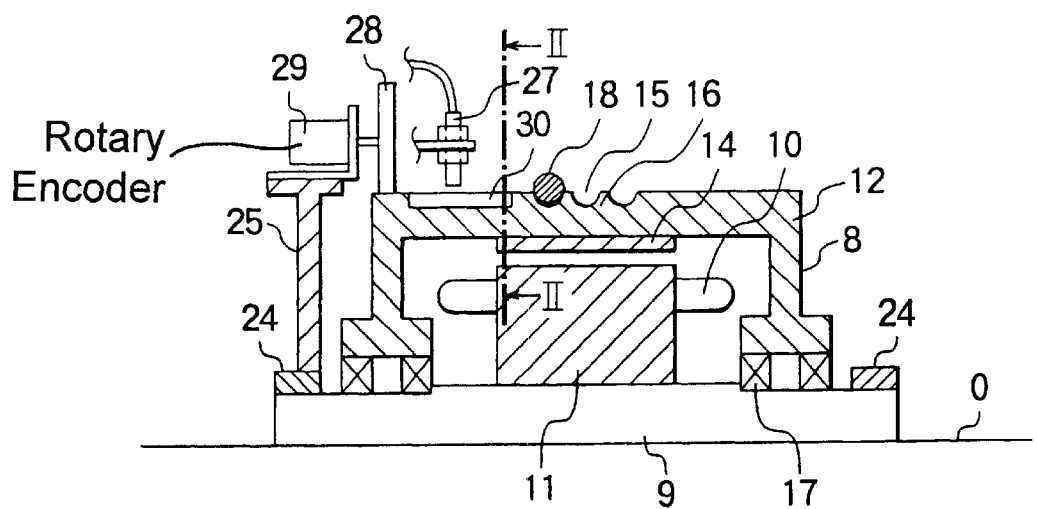
FIG. 1 is a sectional view showing a structure of a drive machine for elevators according to Embodiment 1 of the present invention.

FIG. 1 is a sectional view showing a structure of a drive machine for elevators according to one embodiment of the present invention. In FIG. 1, the same or corresponding parts as or to those in the conventional drive machine described above are denoted by the same symbols.

A winder 8 mainly comprises a stationary shaft 9 having opposite ends supported by supporting fixtures 24, an armature iron-core 11 (armature) having armature coils 10 wound over the same, and a rotor 12 rotatably supported by the shaft 9 and constituting a drive sheave 16. Note that 0 denotes an axis of the shaft 9.

The rotor 12 includes a field permanent magnet 14 (field magnet) disposed inside the rotor to face the armature iron-core 11, cable grooves 15 formed in an outer periphery of the rotor for receiving a main cable 18 wound over the rotor, and machined portions 30 (detected portions) in the form of recesses which are used to detect the magnetic pole position of the field permanent magnet 14. Additionally, bearings 17 are disposed between the rotor 12 and the shaft 9.

While the winder utilizing the permanent magnet 14 as a field magnet is described here, the present invention is also similarly applicable to another type of winder wherein an iron core having coils wound around the same is disposed (not shown) in place of the permanent magnet, and electric power is supplied to the coils through a slip ring, thereby generating a magnetic field as with the permanent magnet.

Further, around the winder 8, there are provided proximity switches 27 as field magnetic pole detectors for detecting the position of each machined portion 30 in the form of a recess, and a rotary encoder 29 serving as a rotation detector and including a roller 28 held pressed against the outer periphery of the rotor 12 for detecting the rotating speed and the rotating direction of the rotor 12. Numeral 25 denotes a mounting stand for the rotary encoder 29. The proximity switches 27 may be attached to the mounting stand 25, or may be attached to a dedicated mounting stand (not shown) which is provided separately.

Figure 2:
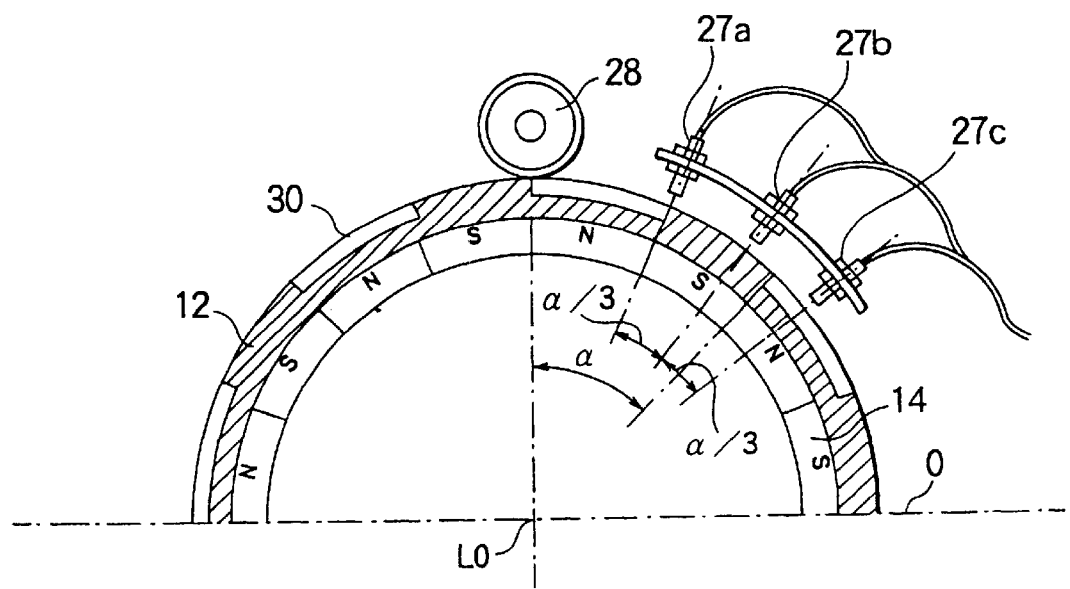
FIG. 2 is a sectional view taken along the line II—II of FIG. 1.

FIG. 2 is a sectional view taken along the line II—II of FIG. 1, showing the positional relationship among the machined portion 30 in the form of a recess, the field permanent magnet 14, and the proximity switches 27a–27c. Referring to FIG. 2, the outer periphery of the rotor 12 is machined to have a recess (30) in a position coincident with the position of each N pole of the field permanent magnet 14 where the pole is fixed to the rotor 12, as viewed from the center LO of the rotating shaft in the radial direction, while the rotor outer periphery is not machined to have a recess in a position coincident with the position of each S pole where it is fixed to the rotor 12.

To detect the positions of the concave and convex machined portions 30 formed in the outer periphery of the rotor 12, three proximity switches 27a–27c are mounted in a close relation to the concave and convex machined portions 30. Supposing that an angle occupied by one pair of N and S poles of the field permanent magnet 14 is $\alpha$, the proximity switches 27a–27c are arranged along the outer periphery of the rotor 12 in such positions that the interval (pitch) between the proximity switches is $\alpha/3$.

Next, how respective signals from the proximity switches 27a–27c change depending on their relative positions to the concave and convex machined portions 30 will be described in conjunction with FIG. 3. For the convenience of explanation, the positions of the concave and convex portions and the magnets, and the mount positions of the proximity switches are represented in the linear form.

Figure 3:
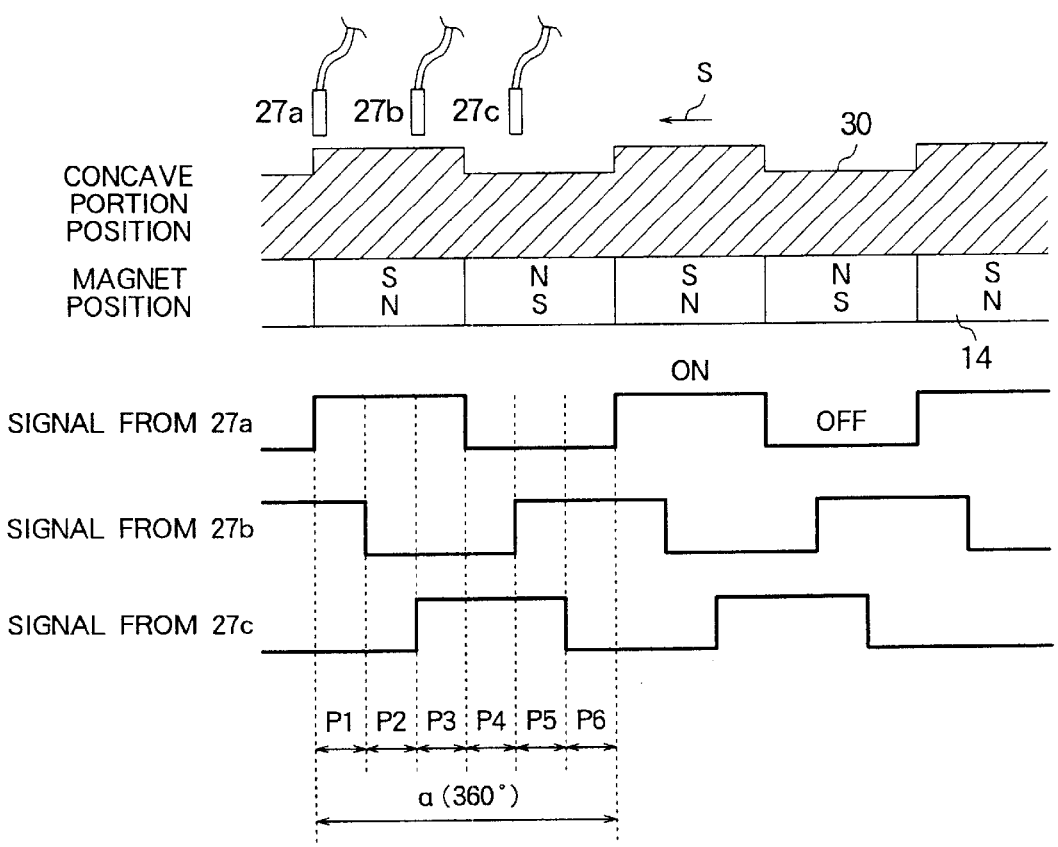
FIG. 3 is a chart showing the correlation between the positions of proximity switches shown in FIG. 2 and signals from the proximity switches.

When the concave and convex portions are moved from the position shown in FIG. 3 in the direction of arrow S, the signals from the proximity switches 27a–27c change as shown, namely change in six combinations P1–P6, while the rotor moves through-the angle a corresponding to one pair of the concave and convex portions. After that, the signals from the proximity switches 27a–27c change in the same manner repeatedly. Since the concave and convex portions are positioned in a one-to-one relation to the magnetic poles, $\alpha$ is given by 360 degrees representing one cycle of the magnetic pole phase, and therefore P1 to P6 each represent a range of 60 degrees. In other words, the m magnetic pole position can be determined based on the combinations in state of the signals from the proximity switches 27a–27c with resolution of 60 degrees.

As well known, a synchronous motor of the type employing a permanent magnet cannot start up unless the magnetic pole position of a fled magnet is known at the time of start-up. With the method according to this Embodiment, the magnetic pole position can be detected with an angular range of 60 degrees. Assuming that the magnetic pole position locates at the middle of the 60-degree range, an error between the actual magnetic pole position and the measured magnetic pole position is ± 30 degrees at maximum. When the synchronous motor of the type employing a permanent magnet is operated under vector control, a torque reduction of 13% occurs at a maximum error because of cos30°=0.87, but a sufficient torque for the start-up can be generated. Once the rotor 12 is rotated and a level of the signal from any-one of the proximity switches 27a–27c is changed over, the magnetic pole position can be precisely detected at that time, and current phase control can be performed with a highly-accurate magnetic pole position signal since then.

When later-described drive control means for the winder 8 in the form of a motor, shown in FIG. 6, cannot know in which position the motor locates relative to the corresponding field magnetic pole at the start-up, i.e., when it is not known how far the motor has rotated, before stopping, from the changing-over point of the magnetic pole to be detected, an imaginary position in the field magnet is introduced and phase control is performed in accordance with the imaginary position in the field magnet until the first field magnetic pole detector starts operation. By so doing, the drive sheave can be started up even if the position in the field magnet is not known at the start-up.

Further, since the changing-over point between the concave and convex portions is coincident with the changing-over point between the magnetic poles, this provides such an advantage that the changing-over point between the magnetic poles can be directly read based on the signals from the proximity switches 27a–27c. On the other hand, the rotating direction and the rotating speed of the rotor 12 are determined based on a signal from the rotary encoder 29.

The concave and convex machined portions may be provided in any other suitable locations than the outer periphery of the rotor. A similar operating effect as described above can be obtained if the concave and convex machined portions are located in coincidence with the positions of the magnetic poles of the field magnet as viewed from the center of the rotating shaft in the radial direction. The similar operating effect can also be obtained by attaching a ring with concave and convex portions in coincidence with the magnetic pole positions rather than directly machining the rotor (drive sheave) to have the concave and convex portions.

As described above, since the proximity switches 27a–27c serving as field magnetic pole detectors and the rotary encoder 29 serving as a rotation detector are arranged as separate components in an easily detachable manner, it is easy to carry out check and displacement in the event of failure.

Moreover, since the field magnetic pole position is directly detected from the concave and convex machined portions 30 precisely corresponding to the field permanent magnet 14 which provides field magnetic poles, the winder can be controlled with good accuracy.

Second Embodiment

Figure 4:
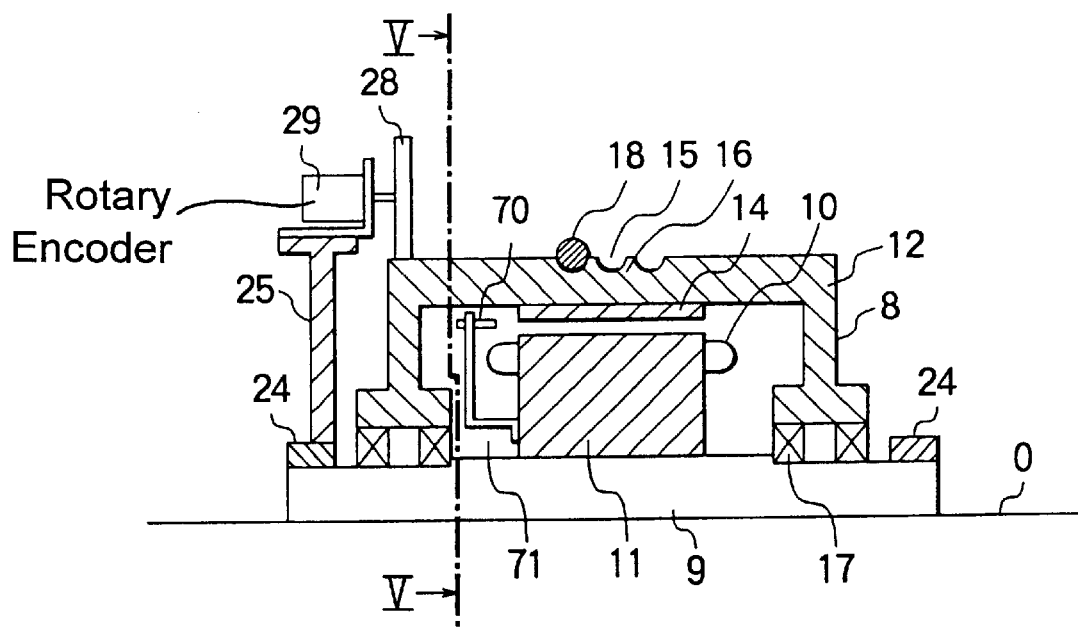
FIG. 4 is a sectional view showing a structure of a drive machine for elevators according to Embodiment 2 of the present invention.
Figure 5:
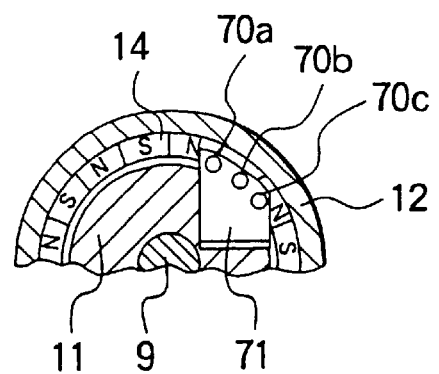
FIG. 5 is a sectional view taken along the line V—V of FIG. 4.

FIG. 4 is a sectional view showing a structure of a drive machine for elevators according to another embodiment of the present invention, and FIG. 5 is a sectional view taken along the line V—V of FIG. 4. A principal part of this embodiment is the same as shown in FIGS. 1 and 2. This embodiment employs, as field magnetic pole detectors, three magnetic sensors 70a–70c provided in the proximity of the field permanent magnet 14. Numeral 71 denotes a mounting fixture for the magnetic sensors 70a–70c. The magnetic sensors 70a–70c obtain information about the position of a field magnet, i.e., the field magnetic pole position, by directly detecting the magnetic field generated by the field permanent magnet 14.

With such an arrangement, since the magnetism generated by the field magnet is directly detected by the magnetic sensors, the construction is simplified and the magnetic pole position can be more precisely obtained. In addition, by combining the magnetic sensors with a permanent magnet to provide field magnetic poles, the position in the field magnet can be roughly detected from the magnitude of detected magnetic flux even while the rotor is stopped.

Third Embodiment

A phase control method used in the case of detecting the rotation of the winder 8 by the rotary encoder 29 using the roller 28, and detecting the magnetic pole position by separate magnetic pole position detectors, as described in the above First and Second Embodiments, will be described below with reference to FIGS. 6 and 7. FIG. 6 is a control block diagram of an inverter for driving the winder 8 which comprises a synchronous motor of the outer rotor type employing a permanent magnet as a field magnet. Note that an elevator control section, a position control section, etc., which are not directly related to the present invention, are omitted from the drawing.

Figure 6:
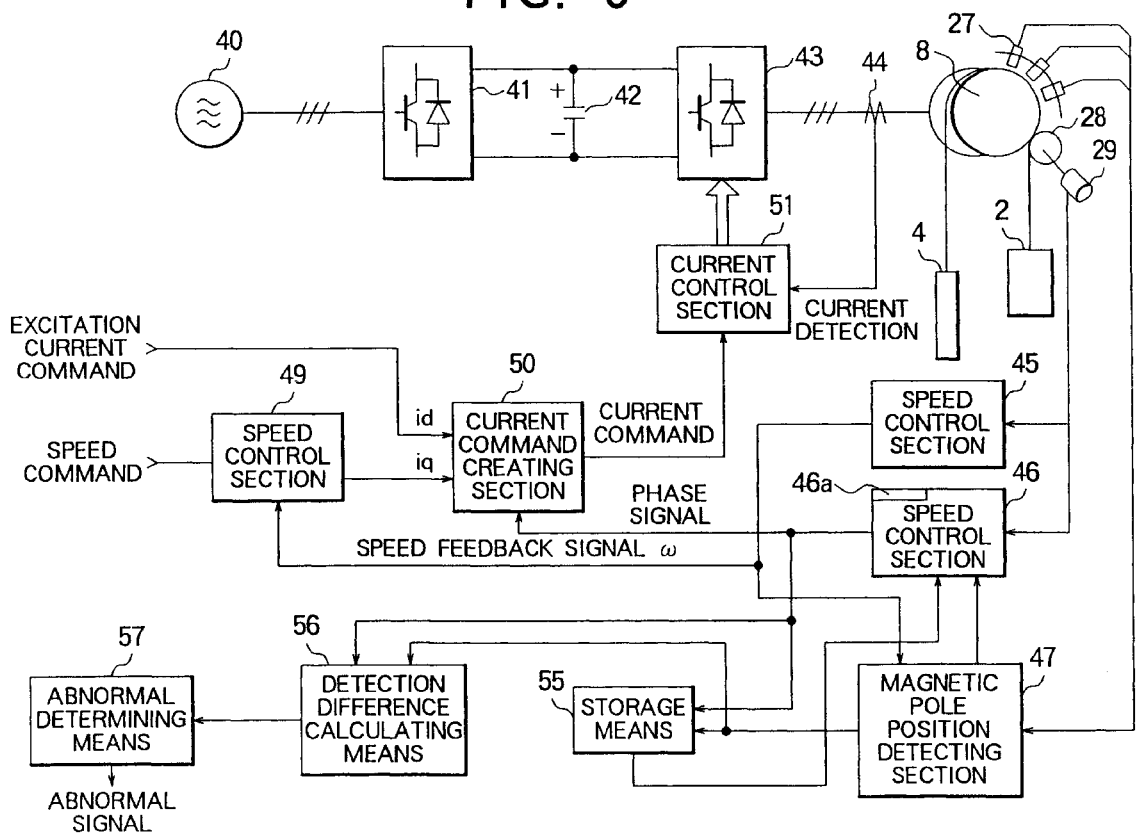
FIG. 6 is a block diagram showing inverter control in drive machine according to Embodiments 3 and 4 of the present invention.

In FIG. 6, the same or corresponding parts as or to those in the above Embodiments are denoted by the same symbols. Numeral 43 denotes an inverter for driving the winder 8 which comprises an outer rotor motor, 27 denotes a proximity switch for detecting the field magnetic pole position within the winder 8, and 29 denotes a rotary encoder for detecting the rotation of the winder 8 through the roller 28. Further, denoted by numeral 40 is a power supply, 41 is a converter, 42 is a smoothing capacitor, 2 is an elevator cage, and 4 is a counterweight.

Numeral 45 denotes a speed detecting section for determining the speed based on a signal from the rotary encoder 29, 46 denotes a phase detecting section for determining the current phase based on a signal from the rotary encoder 29, 47 denotes a magnetic pole position detecting section for determining the magnetic pole position based on signals from the proximity switches 27, 49 denotes a speed control section for combining a speed command and a speed feedback signal a to calculate a torque current command iq, 50 denotes a current command creating section for calculating a current command from an excitation current command id, the torque current command iq and a phase signal θ, and 51 denotes a current control section for combining the current command and a current detection signal from a current sensor 44 to output a control signal to the inverter 43.

Numeral 55 denotes memory means for storing, in a correlated manner, the current phase, i.e., the position in the field magnet, determined by the phase detecting section 46 based on the signal from the rotary encoder 29, and the magnetic pole position recognized by the magnetic pole position detecting section 47 based on the signals detected by the proximity switches 27. Numeral 56 denotes detection difference calculating means for determining the difference between the magnetic pole position recognized by the magnetic pole position detecting section 47 based on the signals detected by the proximity switches 27 and the magnetic pole position determined by the phase detecting section 46 based on the signal from the rotary encoder 29. Numeral 57 denotes anomaly determining means for generating an abnormal signal upon determining the occurrence of an anomaly if the difference or deviation in the magnetic pole position resulted from the different detectors and determined by the detection difference calculating means 56 exceeds a predetermined value.

A manner of determining the phase signal θ will now be described with reference to FIG. 7. In FIG. 7, alphabet A represents an initial state immediately after power-on, and the phase signal θ is set to a phase signal θA that is determined from a combination of the signals from the three proximity switches 27 in accordance with the above-described method. Subsequently, when the winder 8 is rotated and a pulse signal is outputted from the rotary encoder 29 with the rotation of the winder 8, the phase detecting section 46 counts the number of the pulses, and outputs the phase signal θ after multiplying the counted number by a phase angle corresponding to one pulse. Further, in the synchronous motor, the current phase signal θ must be coincident with the cycle of the magnetic pole position of the field magnet.

Figure 7:
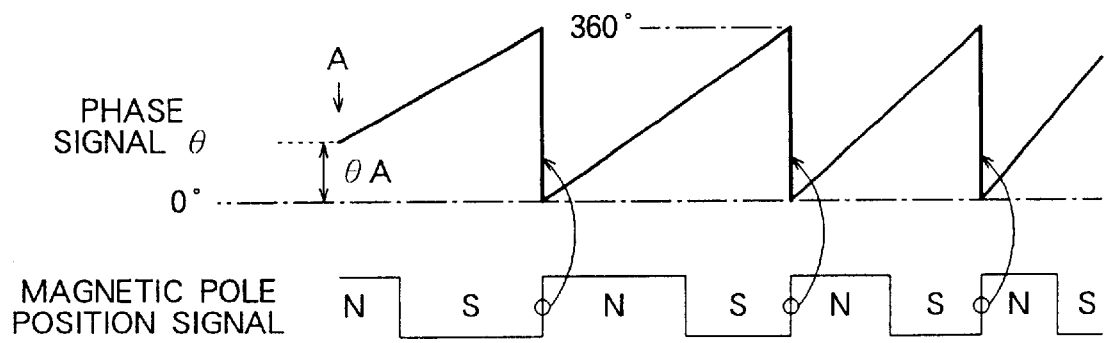
FIG. 7 is a waveform chart for explaining the operation of Embodiment 3 of the present invention.

To that end, the phase signal θ is reset to be coincident with 0 degree, for example, at the changing-over point from the S to N pole of the magnetic pole position signal determined based on the signals from the proximity switches 27, as shown in FIG. 7.

Figure 8:
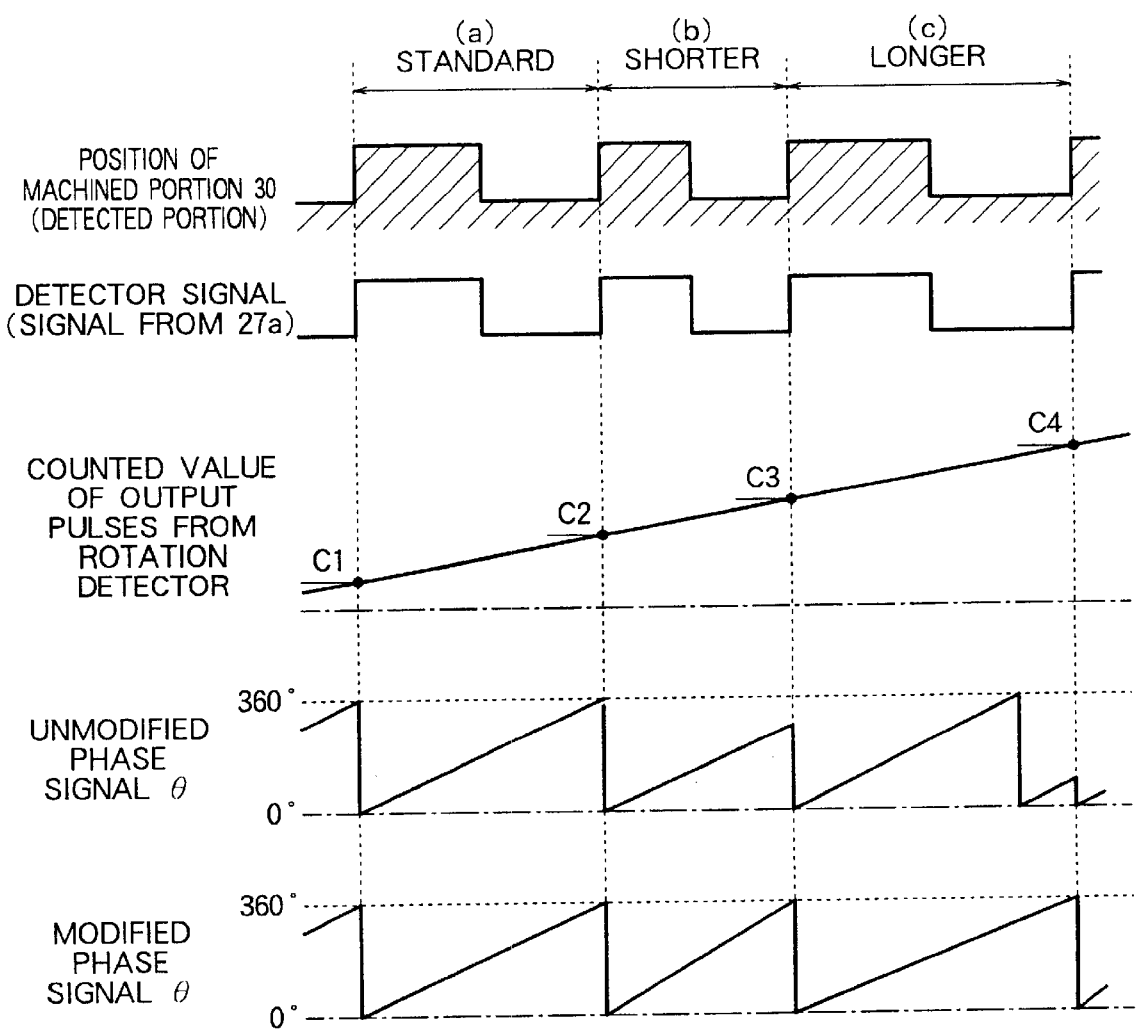
FIG. 8 is a waveform chart for explaining another operation of Embodiment 3 of the present invention.

As shown in FIG. 8, however, the length of one cycle of each detector signal may change due to errors in machining of the concave machined portions 30 serving as the detected portions in Embodiment 1, or errors in installation of the proximity switches 27a–27c used in Embodiment 1 and the magnetic sensors 70a–70c used in Embodiment 2 which serves as the field magnetic pole detectors. If the length of one cycle is shortened, for example, the phase signal θ is reset to 0 degree before reaching 360 degrees. Conversely, if the length of one cycle is prolonged, the phase signal θ is reset midway the succeeding cycle. This results in that the H phase signal θ becomes not consistent and the motor cannot rotate smoothly.

To cope with the above-mentioned problem, the length corresponding to each cycle of the magnetic poles is stored as the difference in counted value of the output pulses from the rotation detector (rotary encoder 29) over the entire circumference of the winder 8. Thus, a time period (a) in FIG. 8 is represented by a value of C2-C1, a time period (b) by a value of C3-C2, and a time period (c) by a value of C4-C3.

In a shorter time period, e.g., the time period (b), than the standard one (a), the amount of change in value of the phase signal θ corresponding to one count of the output pulses from the rotation detector is calculated from the stored pulse counted values, and is set to be larger than in the standard time period to modify the value of the phase signal θ so that one cycle completes at 360 degrees. Conversely, in a longer time period, e.g., the time period (c), than the standard one (a), the amount of change in value of the phase signal e is set to be smaller than in the standard time period to modify the value of the phase signal θ so that one cycle completes at 360 degrees. Stated otherwise, as shown in FIG. 8, while the phase signal θ has the same slope for each time period in the unmodified case, the slope of the phase signal θ is changed depending on the stored length of one cycle in the modified case. With such a modification, the value of the phase signal θ is kept from becoming inconsistent, and smooth phase control can be achieved.

The operation in the above case will be described below with reference to FIG. 6. After the winder 8 has started up, the magnetic pole position detecting section 47 detects the changing-over point in the cycle of the magnetic poles, and assigns the successive number to each cycle from-the first cycle over a full turn. At the same time, the assigned numbers and the difference in counted value of the output pulses from the rotary encoder 29 for each cycle are stored in the storage means 55. After that, the magnetic pole position detecting section 47 outputs, to the phase detecting section 46, information indicating in what number of magnetic pole cycle the winder 8 is positioned at this moment. In accordance with the indicated number of magnetic pole cycle, the phase detecting section 46 reads the difference in counted value of the corresponding magnetic pole cycle from the storage means 55, and determines the length of the cycle. Then, in consideration of correspondence between the signal newly inputted from the rotary encoder 29 and the length of the cycle, the phase detecting section 46 modifies and calculates the phase signal θ so that one cycle completes at 360 degrees. The modified phase signal θ is outputted to the current command creating section 50.

On the other hand, because the rotation of the winder 8 is detected by the rotary encoder 29 using the roller 28, there is a possibility that slippage of the roller may occur. The function of detecting such a slippage and the function of generating an abnormal signal will now be described with reference to FIG. 9.

Figure 9:
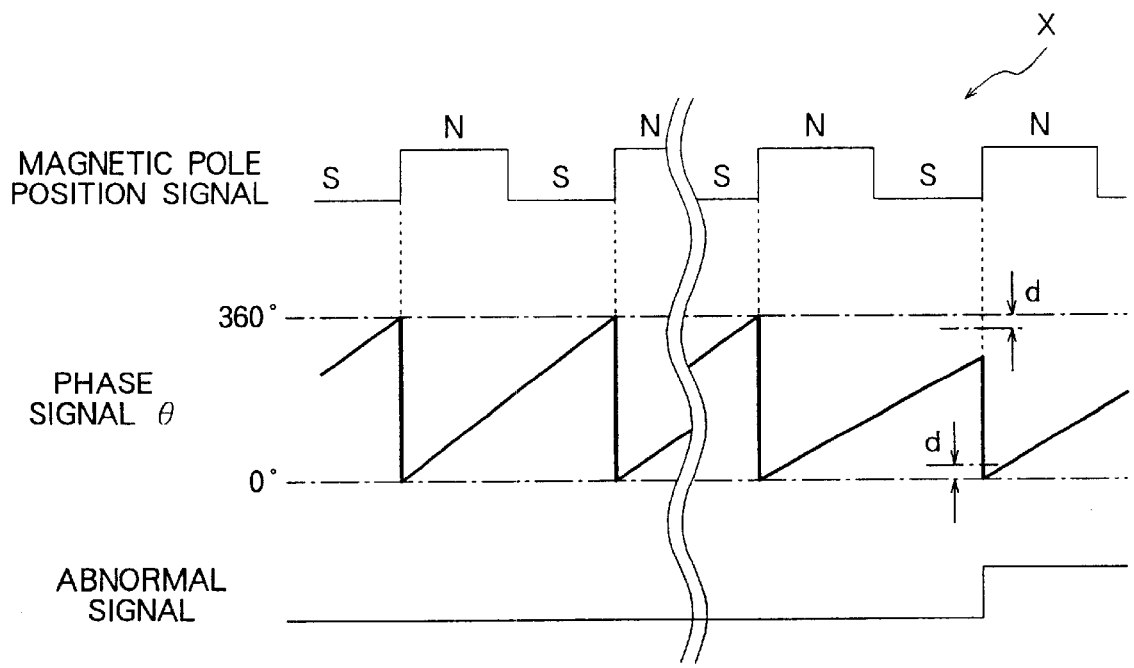
FIG. 9 is a waveform chart for explaining still another operation of Embodiment 3 of the present invention.

If the rotation of the rotary encoder 29 becomes slower than the rotation of the winder 8 due to slippage of the roller 28 during the operation, the phase signal θ deviates by a large amount from 360 degrees at the changing-over point of the magnetic pole position signal as indicated by X in FIG. 9. In view of such a problem, at the changing-over point from the S to N pole of the magnetic pole position signal from the magnetic pole position detecting section 47, the detection difference calculating means 56 determines how far the phase signal θ from the phase detecting section 46 deviates from 0 degree or 360 degrees. Then, the anomaly determining means 57 sets an angle of a certain width d at the changing-over point from the S to N pole of the magnetic pole position signal from the magnetic pole position detecting section 47 as shown in FIG. 9, and monitors whether the angle of the phase signal θ from the phase detecting section 46 deviates over the angle d not, thereby outputting an abnormal signal if the deviation over the angle d occurs. The width of d is set to about 10 degrees in terms of phase angle, taking into account that a torque reduction should not be so increased and that a speed detection error should not be so enlarged.

Further, when the rotation of the winder 8 is sped up, there also occurs an error in the magnetic pole position signal due to a delay in operation of the proximity switches 27. Since this error is proportional to the speed, the speed feedback signal ω is applied to the magnetic pole position detecting section 47 which creates the magnetic pole position signal after compensating for the error in accordance with the speed feedback signal ω. This process increases the accuracy in detecting slippage of the roller. On the other hand, a response speed of the rotary encoder 29 is sufficiently high and a delay in operation thereof is negligible.

Fourth Embodiment

When the rotation of the winder 8 is detected by the rotary encoder 29 using the roller 28 like the above Embodiment 1, the roller 28 may be abraded to cause a change of configuration over time and hence to produce an error in the phase signal θ. Supposing, for example, that the roller 28 has a diameter of 100 mm and the length of one pair of magnetic poles of the field permanent magnet 14 is exactly equal to ½ of the outer circumference of the roller 28, if the roller 28 is abraded 0.1 mm and the diameter is changed to 99.8 mm, the phase signal θ would shift 90 degrees in terms of the magnetic pole phase after only 62.5 rotations of the roller 28. The 90-degree shift of the magnetic pole phase means that the torque applied to the winder 8 becomes zero.

Figure 10:
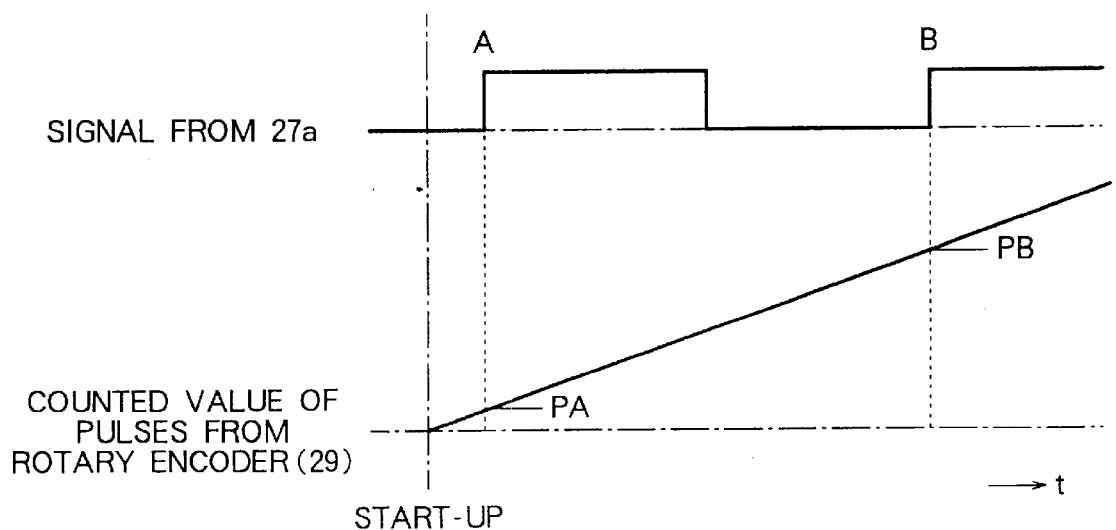
FIG. 10 is a waveform chart for explaining the operation of Embodiment 4 of the present invention.
Figure 11:
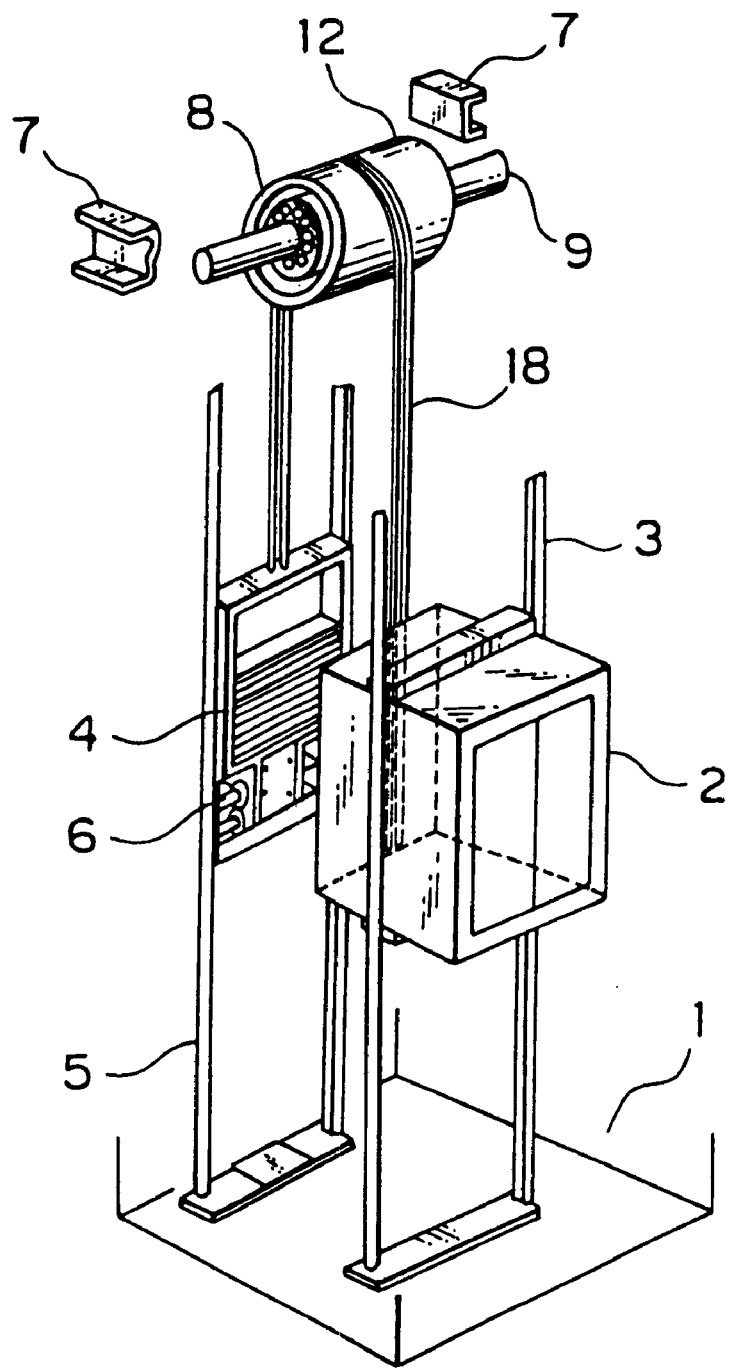
FIG. 11 is a perspective view of a conventional elevator apparatus including a winder which comprises an outer rotor.
Figure 12:
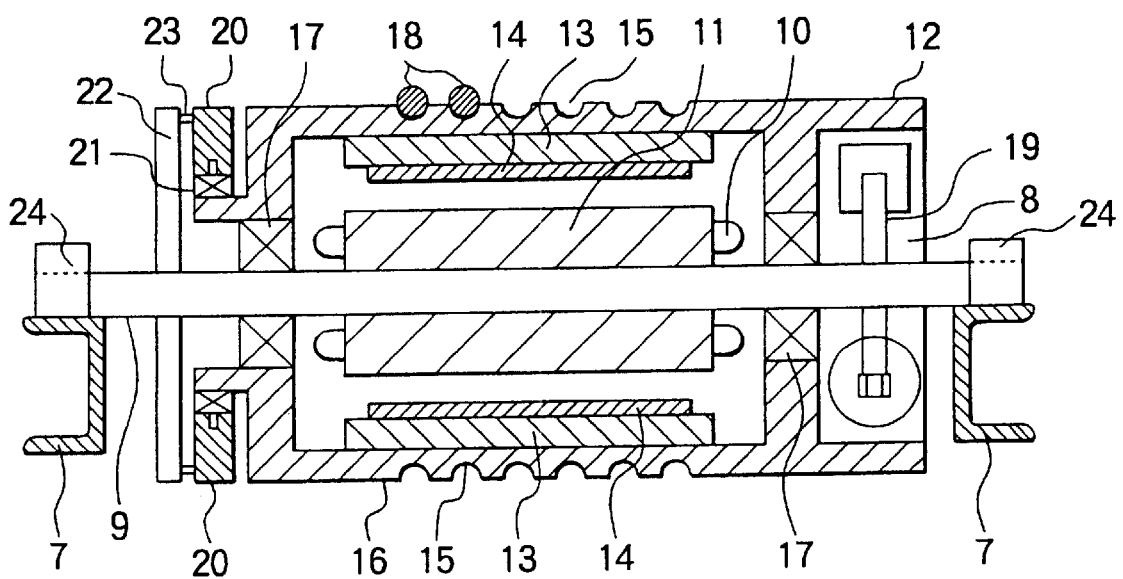
FIG. 12 is a sectional view showing a structure of a conventional drive machine for elevators which comprises an outer rotor.

To cope with that problem, as shown in FIG. 10, immediately after the start-up of the winder 8, the number of output pulses from the rotary encoder 29 is counted (a value given by PB-PA in the drawing) for one cycle of the signal from the proximity switch 27 (indicated by the signal from 27a in the drawing), and the counted value is used as a reference value for-one cycle of the magnetic pole phase in the subsequent phase calculation until the winder 8 is stopped. Since the length of one pair of magnetic poles of the field permanent magnet 14 is fixed regardless of the roller abrasion, the pulse count for one cycle of the magnetic pole phase can be correctly detected even if the roller diameter varies due to a change of configuration over time. As an alternative, counting the number of pulses over several cycles and calculating an average of the counted numbers as a standard value further increases the accuracy. Such a modification can be easily implemented, for example, by adding a correcting section 46a, which has the calculating and storing functions and the temporarily storing function required for the modified process, to the phase detector 46 shown in FIG. 6.

Industrial Applicability

As described above, according to the first aspect of the present invention, a drive machine for elevators comprises a rotatable drive sheave over which a main cable for hanging an elevator cage is wound, a stationary shaft for supporting rotation of the drive sheave and bearing a load applied to the drive sheave from the main cable, a field magnet attached to the drive sheave, constituting a part of an electric motor, and comprising at least one pair of magnetic poles, an armature attached to the stationary shaft in a facing relation to the field magnet and constituting another part of the motor, and a field magnetic pole detector for detecting the predetermined magnetic pole of the field magnet rotated together with the drive sheave. With the provision of the field magnetic pole detector capable of directly and precisely detecting the position in the field magnet, rotational angle control of the drive sheave and control of the motor can be implemented with good accuracy.

According to the second aspect of the present invention, on the basis of the first aspect, the field magnet comprises a permanent magnet. If a field magnet using winding coils is attached to the rotatable drive sheave, a special device such as a slip ring is required to supply excitation currents to the coils. By contrast, the use of a permanent magnet eliminates the need of such a special device.

According to the third aspect of the present invention, on the basis of the first or second aspect, the field magnetic pole detector comprises a magnetic sensor attached to the stationary side in a close and facing relation to the field magnet. Therefore, the magnetism generated by the field magnet can be directly detected by the magnetic sensor, and hence the construction is simplified. In addition, by combining the magnetic sensor with the use of the above permanent magnet, the position in the field magnetic can be roughly detected from the magnitude of detected magnetic flux even while the motor is stopped.

According to the fourth aspect of the present invention, on the basis of the first aspect, a detected portion indicating the position of the magnetic pole disposed on the drive sheave is provided on the drive sheave in a facing relation to the field magnetic pole detector, and the position of the predetermined magnetic pole is recognized with the field magnetic pole detector detecting the detected portion. With this feature, an optimum detected portion adapted for the field magnetic pole detector can be provided on the drive sheave, and the detecting position can be set with good accuracy and high flexibility.

According to the fifth aspect of the present invention, on the basis of the fourth aspect, the detected portion comprises a convex or concave portion formed on or in the surface of the drive sheave corresponding to the position of the predetermined magnetic pole. By simply machining a portion of a body of the drive sheave in synch with the magnetic pole position of the field magnet attached to the drive sheave, therefore, the detected portion can be formed without intricate machining and additional parts to constitute special detected means.

According to the sixth aspect of the present invention, on the basis of the-first aspect, the field magnetic pole detector is provided at least three at a pitch equal to ⅓ of the pitch of one pair of the field magnetic poles. Therefore, the field magnetic pole position can be recognized with resolution of 60 degrees by only the field magnetic pole detectors. In other words, the field magnetic pole position can be detected by a small number of field magnetic pole detectors. In addition, even the resolution of 60 degrees corresponds to a torque error less than 15% in control of the motor, and is within the allowable range from the viewpoint of control capability.

According to the seventh aspect of the present invention, on the basis of second or sixth aspect, the drive machine for elevators further comprises a rotation detector for detecting rotation of the drive sheave with respect to the stationary shaft as a reference, and drive control means for executing drive control of the motor in accordance with results detected by the rotation detector and the field magnetic pole detector, wherein the drive control means starts up the motor in accordance with an imaginary field magnetic pole position when the magnetic pole position of the field magnet attached to the drive sheave is not known at the start-up of the elevator, and executes the drive control in accordance with the results detected by the field magnetic pole detector and the rotation detector after the field magnetic pole-position has been recognized upon operation of the field magnetic pole detector. With this feature, when the drive control means cannot know in which position the motor locates relative to the corresponding field magnetic pole at the start-up, i.e., when it is not known how far the motor has rotated, before stopping, from the point to be detected (the changing-over point of the field magnetic pole), the imaginary field magnetic pole position is introduced and phase control is performed in accordance with the imaginary field magnetic pole position until the first field magnetic pole detector starts operation. Thus, the drive sheave can be started up even if the position in the field magnet is not known at the start-up.

According to the eighth aspect of the present invention, on the basis of the first aspect, the drive machine for elevators further comprises a rotation detector for detecting rotation of the drive sheave with respect to the stationary shaft as a reference, detection difference calculating means for detecting the difference between the rotation of the drive sheave detected by the rotation detector and the rotation of the drive sheave detected by the field magnetic pole detector, and anomaly determining means for determining the occurrence of an anomaly when a value of the difference determined by the detection difference calculating means exceeds a predetermined value. It is therefore possible to early find an anomaly in the rotation detector, the field magnetic pole detector, or the detected portion.

According to the ninth aspect of the present invention, on the basis of the eighth aspect, the drive machine for elevators further comprises drive control means for executing drive control of the motor in accordance with results detected by the rotation detector and the field magnetic pole detector, wherein when the value of the difference determined by the detection difference calculating means does not exceed the predetermined value, the drive control means executes the control while correcting an output value of the rotation detector in accordance with the value of the difference. Accordingly, if there occurs a slight anomaly such as abrasion of a roller over time, the elevator can continue the operation for the present just by slightly correcting a detected value of the rotation detector. As a result, a rest time of the elevator attributable to the detection of anomaly can be minimized.

According to the tenth aspect of the present invention, on the basis of the first aspect, the drive machine for elevators further comprises a rotation detector for detecting rotation of the drive sheave with respect to the stationary shaft as a reference, memory means for storing an output of the rotation detector in a corresponding relation to the position detected by the field magnetic pole detector while the field magnetic pole detector is detecting the field magnetic pole position with the rotation of the drive sheave, and drive control means for executing drive control of the motor in accordance with results detected by the rotation detector and the field magnetic pole detector, wherein the drive control means utilizes values stored in the memory means for phase control of electric power supplied to the armature. The accuracy in installation of the field magnetic pole detector or the corresponding detected portion may affect phase control for one rotation of the drive sheave. Further, it is not always ensured that the pitch of the pair of field magnetic poles is divided so as to evenly cover one rotation. Storing values detected by each field magnetic pole detector and values detected by the rotation detector makes it possible to implement the phase control with good accuracy by referring to the stored value and utilizing them in a combined manner for effective compensation.

According to the eleventh aspect of the present invention, on the basis of the first aspect, the drive machine for elevators further comprises a rotation detector for detecting rotation of the drive sheave with respect to the stationary shaft as a reference, and drive control means for executing drive control of the motor in accordance with results detected by the rotation detector and the field magnetic pole detector, wherein the amount of change in value detected by the rotation detector is determined at the start-up of the elevator while the field magnetic pole detector detects one pair of the field magnetic poles, and the drive control means executes phase control of the motor by setting the above amount of change as a reference value of a phase signal for one pair of the field magnetic poles since then. When the values detected by the rotation detector are neither sure nor definite with respect to the field magnetic poles, the amount of change in value detected by the rotation detector while the field magnetic pole detector detects the first pair of field magnetic poles is set as a temporary reference and is utilized in subsequent calculation for the phase control. Even if the position in the field magnet is not known since then, the phase calculation can be relatively precisely implemented. Once the drive sheave makes a turn under the drive control based on the temporary reference, the subsequent phase control can be implemented with good accuracy by precisely recognizing the mutual positions detected by each field magnetic pole detector and the rotation detector during the turn as with the above tenth aspect of the present invention.

What is claimed is:

1. A drive machine for elevators comprising:
   an electric motor including a rotatable drive sheave over which a main cable for hanging an elevator cage is wound,
   a stationary shaft for supporting rotation of said drive sheave and bearing a load applied to said drive sheave by said main cable,
   a field magnet attached to said drive sheave and comprising at least one pair of magnetic poles,
   an armature attached to said stationary shaft, facing said field magnet and constituting part of said motor,
   a field magnet pole detector for detecting a magnetic pole of said field magnet rotating together with said drive sheave,
   a rotation detector for detecting rotation of said drive sheave with respect to said stationary shaft,
   detection difference calculating means for detecting a difference between the rotation of said drive sheave detected by said rotation detector and rotation of said drive sheave detected by said field magnet pole detector, and
   anomaly determining means for determining occurrence of an anomaly when the difference determined by said detection difference calculating means exceeds a threshold value.

2. The drive machine for elevators according to claim 1, further comprising drive control means for controlling said motor in response to rotation detected by said rotation detector and the magnetic pole detected by said field magnet pole detector wherein, when the difference determined by said detection difference calculating means does not exceed the threshold value, said drive control means controls said motor while correcting an output of said rotation detector in response to the difference.

* * * * *